United States Patent [19]

Cardenas et al.

[11] Patent Number: 4,670,504

[45] Date of Patent: Jun. 2, 1987

[54] IONIZABLE OLEFIN BASED RESINOUS TACKIFIERS FOR LATEX

[75] Inventors: Carlos G. Cardenas; James M. Evans; Charles J. Stark, all of Jacksonville, Fla.; William J. Ehmann, Belmont, Mass.

[73] Assignee: Sylvachem Corporation, Jacksonville, Fla.

[21] Appl. No.: 752,736

[22] Filed: Jul. 8, 1985

Related U.S. Application Data

[63] Continuation-in-part of Ser. No. 722,327, Apr. 12, 1985, abandoned, which is a continuation-in-part of Ser. No. 603,277, Apr. 24, 1984, abandoned, which is a continuation-in-part of Ser. No. 495,881, May 18, 1983, abandoned.

[51] Int. Cl.$^4$ ............................................. C08L 51/04
[52] U.S. Cl. ................................... 524/504; 524/518; 524/525; 524/529; 524/531; 524/532; 524/533; 524/534; 525/285; 525/301; 525/327.7; 525/330.1; 526/281
[58] Field of Search ............... 524/518, 525, 532, 534, 524/504, 529, 531, 533; 525/285, 327.7, 330.1, 301; 526/281

[56] References Cited

U.S. PATENT DOCUMENTS

| | | | |
|---|---|---|---|
| 1,993,034 | 3/1935 | Humphrey | 526/272 |
| 1,993,035 | 3/1935 | Littmann | 526/272 |
| 2,608,550 | 8/1952 | Rowland et al. | 525/301 |
| 2,634,256 | 4/1953 | Sparks et al. | 525/285 |
| 3,422,044 | 1/1969 | Erikson et al. | 524/529 |
| 3,432,339 | 3/1969 | Howell et al. | 524/525 |
| 3,467,632 | 9/1969 | Davis | 526/281 |
| 4,101,495 | 7/1978 | Patzchke et al. | 525/301 |
| 4,183,834 | 1/1980 | Evans et al. | 428/500 |
| 4,235,981 | 11/1980 | Tsuchiya | 524/531 |
| 4,501,827 | 2/1985 | Nagano et al. | 524/504 |
| 4,533,700 | 8/1985 | Mizui et al. | 524/531 |

FOREIGN PATENT DOCUMENTS 978292  12/1964  United Kingdom ............... 524/531

Primary Examiner—Paul R. Michl
Assistant Examiner—Alex H. Walker
Attorney, Agent, or Firm—Bucknam and Archer

[57] ABSTRACT

There is provided a tackifier composition especially suited for use with natural rubber latex and formed from an olefin resin, preferably a polymerized terpene hydrocarbon resin condensed with an unsaturated carboxylic acid or anhydride, optionally partially esterified with a $C_1$–$C_{30}$ alcohol or phenol, and neutralized with a base, preferably a volatile base such as an amine, and then dispersed in an aqueous medium. The tackifier when added to a latex forms compositions useful particularly as pressure sensitive adhesives.

11 Claims, No Drawings

IONIZABLE OLEFIN BASED RESINOUS TACKIFIERS FOR LATEX

RELATED APPLICATION

This application is a continuation-in-part of our co-pending application Ser. No. 722,327 filed 12 Apr. 1985, now abandoned, (bearing the same title as the present application), which was in turn a continuation-in-part of application Ser. No. 603,277 filed 24 Apr. 1984, now abandoned, which was, in turn a continuation-in-part of our then copending application Ser. No. 495,881 filed 18 May 1983, now abandoned.

This invention relates as indicated, to a novel adhesive composition and more particularly to a composition of a resinous hydrocarbon polymer and natural rubber latices, or various other latices, and mixtures thereof. The tackifier compositions useful herein are derived from cationically polymerizable olefins and produced as stable aqueous dispersions or emulsions without the aid of a dispersing system, which, when present, has been shown to diminish the properties of certain tackifiers in a latex composition (Skeist, I.; *Handbook of Adhesives*, Second Edition; Van Nostrand Reinhold; New York, 1974).

BACKGROUND OF THE INVENTION AND PRIOR ART

U.S. Pat. No. 4,183,834 discloses tackifiers for various elastomeric latices made from a rosin acid, e.g., modified tall oil rosin or rosin acid oligomer, instead of the modified olefinic hydrocarbon resins of the present invention. It has been found that while the tackifier compositions of the aforesaid patent are particularly suited to tackifying synthetic elastomeric latices such as SBR (carboxylated butadiene/styrene) they are not as well suited to the tackifying of natural rubber latices. Surprisingly, the tackifiers of the present invention are especially well suited to the tackifying of natural rubber latices.

The tackifiers of the present invention are not of themselves novel. However, the combination of an emulsified tackifier composition with a latex, is believed novel especially where the latex consists of or comprises natural rubber latex. Of particular utility as tackifiers for natural rubber containing latices are the terpene hydrocarbon type tackifiers hereinafter more particularly described.

The prior art has described numerous unsaturated hydrocarbon polymers which polymers are then modified with an alpha-beta unsaturated carboxylic acid, such as maleic anhydride, optionally esterified, neutralized and dispersed in water. Such materials are to be distinguished from copolymers of maleic anhydride, for example, and a monomeric terpene hydrocarbon such as disclosed by Humphrey U.S. Pat. No. 1,933,034 dated 5 Mar. 1935, or Littmann U.S. Pat. No. 1,933,035 dated 5 Mar. 1935, or Boggs U.S. Pat. No. 2,230,230 dated 4 Feb. 1941. Coreaction of the alpha-beta unsaturated carboxylic acids, e.g., maleic, with an unsaturated hydrocarbon polymer is shown in Rowland et al U.S. Pat. No. 2,608,550 dated 25 Aug. 1952. The coreaction products therein described may be neutralized to form salts, and used with other resinous materials. Copolymerization of a diolefin with a monoolefin, e.g., butadiene, myrcene, alloocimene, etc., with an octene such as diisobutylene followed by maleinization and neutralization is disclosed by Sparks in U.S. Pat. No. 2,634,256 dated 7 Apr. 1953. These products may be water soluble in which case they are useful for treatment of paper, textiles, leather goods, sizing, etc.

Aldrich et al in U.S. Pat. No. 3,193,449 dated 6 July 1965 discloses terpene polymers reacted with maleic anhydride, neutralized, and emulsified to form a sizing composition for paper in place of rosin size. These materials are similar to the tackifier compositions useful in this invention.

Kincannon in U.S. Pat. No. 3,375,130 dated 26 Mar. 1968 discloses that the reaction product of maleic anhydride with polymerized terpenes (disclosed in U.S. Pat. No. 2,321,750) may be used in the bonding of molten polyolefin to a hydrophilic substrate such as cellulose or glass.

Weymann et al in U.S. Pat. No. 3,413,240 dated 26 Nov. 1968 have disclosed pressure sensitive adhesive compositions comprising a rubbery elastomer and a copolymer of a cyclic monoterpene hydrocarbon and styrene or substituted styrene. The rubber elastomer is first mixed with the tackifier and may then be emulsified or dispersed in water.

Erikson et al in U.S. Pat. No. 3,422,044 dated 14 Jan. 1969 discloses coating compositions using a maleinized drying oil, hydrolyzed, and neutralized for water dispersability. This reaction product can be combined with a latex to form a coating composition.

Wheeler in U.S. Pat. No. 3,478,005 dated 11 Nov. 1969 discloses terpene copolymers with a conjugated $C_5$ diolefin feedstock. These copolymers are said to be tackifiers for pressure sensitive adhesives, e.g., a rubbery elastomer such as natural rubber or a synthetic rubber. The tackifiers are not maleinized.

Patzschke et al in U.S. Pat. No. 4,101,495 discloses modified olefin polymers containing carboxyl groups introduced as by maleinizing, neutralized with a base, and useful in coating compositions, e.g., electrodip-lacquering compositions.

British Pat. No. 978,292 published 23 Dec. 1964 discloses sizing agents made from petroleum resin (polymerized hydrocarbons), maleinized, mixed with tall oil or maleinized tall oil, saponified with alkali and dispersed homogeneously in water to improve the emulsifying property and adhesion to the paper pulp.

None of the prior art of which we are aware discloses an adhesive composition formed from an emulsified tackifier blended with a latex, and particularly natural rubber latex.

It is, therefore, a principal objective of the present invention to provide a novel adhesive composition composed of a tackifier formed from a resinous hydrocarbon polymer and elastomeric latex polymers in general, and natural rubber latices in particular.

BRIEF STATEMENT OF THE INVENTION

Briefly stated, the present invention is in the combination of a latex and a water dispersible resinous tackifier composition which tackifier composition is reactive with an ionizing agent and which resinous composition is the reaction product of a polymerized unsaturated hydrocarbon resin, condensed with an unsaturated carboxylic acid or anhydride, and optionally partially esterified with a $C_1$–$C_{30}$ alcohol or phenol. The carboxylated and esterified resinous composition has a softening point not substantially above 125° C. and an acid number of from 10 to 150. For dispersion in water the resinous product is neutralized with a base, preferably a volatile base, e.g., an amine to form an ionizable reaction product which is readily dispersible in water and then readily admixed with a latex, particularly a natural rubber latex. The combined tackifier emulsion or solution with the elastomeric latex may be applied to a suitable backing or flexible tape, dried or allowed to dry spontaneously, to provide a pressure sensitive adhesive member.

DETAILED DESCRIPTION OF THE INVENTION AND SPECIFIC EXAMPLES

The resinous tackifiers of this invention are prepared by a multistep route that includes:
1. Polymerization of a suitable olefin, or mixture of olefins, by treatment with an acid catalyst.
2. Reaction of the polymer obtained with an unsaturated carbonyl-containing compound at elevated temperature.
3. Optionally, reaction of the product from 2 with an alcohol at elevated temperature in the presence or absence of catalyst.
4. Treatment of the product of 3 with a base capable of rendering the material water-dispersible or emulsifiable. Preferably the base is volatile so that the product of 3 is regenerated by heat treatment.
5. Treatment of the product of 4 with water so as to with latex polymers and imparting tack and peel strength to them.

In obtaining specific and preferred resinous tackifiers useful in this invention, we have polymerized a mixture of terpenes consisting of approximately 2% alpha-pinene, 88% beta-pinene and 10% dipentene, the latter referring to a complex mixture of limonene, alpha- and beta-phellandrene, terpinolene and alpha- and gamma-terpinene. Polymerization was effected by reaction with aluminum chloride, $AlCl_3$, in the presence of xylene as a solvent. This mixture of terpenes can be replaced, partially or totally, by nonterpenoid olefins, such as those derived from petroleum, as long as the resin contains residual olefinic unsaturation. We further anticipate that neither $AlCl_3$ nor xylene is critical to the production of the resins of this invention; thus, toluene, heptane, the menthanes, cyclohexanes, naphthas and the like may replace xylene, while $BF_3.Et_2O$, $CaCl_3$, $CH_3AlCl_2$, $TiCl_4$, and $H_2SO_4$ are examples of polymerization catalysts that serve as replacements for $AlCl_3$. Examples of $BF_3$ complexes useful herein include $BF_3$.diethyl ether, $BF_3$.dibutyl ether, $BF_3$.acetic acid, $BF_3$.propanol, $BF_3$.tetrahydrofuran, etc. The reaction temperature during combination of monomer and catalyst has, so far, proven to have a significant bearing upon the final properties of the adhesives of this invention. We believe that the critical temperature or temperature range required for the production of useful polymers must be determined for each monomer feed.

The preferred polymerizable compositions useful herein are broadly monomeric $C_5$ to $C_{20}$ unsaturated hydrocarbons, and preferably $C_5-C_{10}$ hydrocarbons as the pure monomer, or as a mixture of two or more monomers. Desirably, the polymerizable composition is entirely terpenoid, or where nonterpenoid components are present, the major amount of the polymerizable composition, i.e., more than 50% by weight, consists of a single, ethylenically unsaturated terpene hydrocarbon species, or a mixture of two or more ethylenically unsaturted terpene hydrocarbon species. It has also been found that totally nonterpenoid olefins or mixtures thereof can be used in making the tackifiers hereof although the results have not been found to be as satisfactory as with polymerizable compositions consisting of or comprising an unsaturated terpene hydrocarbon. It also appears that the minimum number of carbons in the polymerizable monomer is 5. Results below that number of carbon atoms have not been found to be satisfactory and 5 carbon atoms is boarderline. We have used 18 carbon atom octadecene as a co-monomer with beta-pinene and produced a satisfactory tackifier in accordance herewith. Also, resinous hydrocarbons formed from mixtures of 5% to 95% beta-pinene, balance predominently piperylene may be used to form tackifiers in accordance herewith.

Specific examples of $C_5-C_{20}$ unsaturated hydrocarbons include, therefore, 2-methyl-2-butene, 2,3-dimethyl-1-butene, 3-methyl-1-pentene, 2-methyl-1-pentene, 2-methyl-2-pentene, 3-methyl-2-pentene, isoprene, piperylene, piperylene, piperylene dimers, 6-methyl-1-heptene, octene-2, alpha-pinene, beta-pinene, dipentene, limonene, alpha and beta-phellandrene, terpinolene, alpha-, gamma-terpinene, dodecene-2, octadecene-1, eicosene-1, and various mixtures including 2 or more of the above. A commercially available petroleum hydrocarbon mixture useful herein to produce an initial hydrocarbon resin has the following composition:

| | |
|---|---|
| 3-methyl-1-pentene | 1.4% |
| 2-methyl-2-butene | 22.4% |
| 2-methyl-1-pentene | 2.5% |
| 2-methyl-2-pentene | 2.1% |
| isoprene | 2.6% |
| piperylene | 48.1% |
| piperylene dimer | 16.4% |
| Other unsat. hydrocarbons containing 5-6 C's. | 4.5% |

Reference may also be had to U.S. Pat. Nos. 3,577,398 and 3,467,632 for nonterpenoid resinous copolymers and polymerization procedures for producing resinous hydrocarbons useful in forming tackifiers in accordance with this invention. The disclosures of these patents are incorporated herein by reference. In general, the resinous hydrocarbon polymers hereof whether terpenoid or nonterpenoid have a softening point less than 125° C., and preferably between 50° C. and 110° C.

In certain instances, particularly where aluminum chloride is used as the polymerization catalyst, it will be found desirable to hold the hydrocarbon resin at an elevated temperature, i.e., from 150° C. to 300° C., preferably above about 230° C., under an inert atmosphere, e.g., $N_2$, for from 5 to 20 hours.

The resinous hydrocarbon polymers prepared in this way are then reacted with an alpha-beta unsaturated carboxylic acid, acid anhydride or lower alkyl ester thereof, e.g., maleic anhydride, at temperatures in excess of 150° C. Such reactions can be performed in the presence of a suitable solvent, such as xylene, in which case the reaction must be performed under pressure, or in the absence of solvent. The preferred procedure employs no solvent and a temperature of 190° C. Two to twenty-four hours are required for completion of the reaction. The majority of the maleic anhydride used becomes chemically incorporated with the polymer, whereas unreacted anhydride and anhydride-derived by-products are removed by distillation. We believe that incorporation occurs through some combination of "ene" and Diels-Alder-type reactions, resulting in a product that contains several anhydride functional groups, although we do not wish to be bound by this belief. We have generally added xylene to the crude reaction product to aid in the distillative removal of the unreacted anhydride and anhydride-derived products, though its addition of their removal has not been found to be necessary.

The amount of maleic anhydride employed has a major impact on the dispersibility of the resin prepared as in step 3 as well as the tackifying properties of the dispersion from step 5. The compatibility of the latter in elastomeric latices is also affected by the extent of anhydride incorporation. With terpene resins, maximum incorporation is effected by reaction with 18–27 wt. % anhydride; however, the proper combination of resin dispersibility, dispersion compatibility and tackifying properties appears at this time to be attained through use of from about 1.0 to 15 wt. % anhydride, especially when the product is used in Hartex 103, a commercially available natural rubber latex from Firestone. The useful range of anhydride may differ widely from polymer to polymer.

It is believed that maleic anhydride can be replaced by other unsaturated carbonyl compounds, such as citraconic anhydride, itaconic anhydride, fumaric acid and maleic acid (and their lower alkyl half esters). These compounds are illustrative of useful unsaturated carbonyl compounds, but the invention should not be interpreted as restricted to their use alone.

Reaction of the product of step 2 with an alcohol offers a way to adjust advantageously both the softening point and acid number of the resin to be dispersed. A variety of branched and straight chain alcohols, including $C_1$–$C_{30}$ aliphatic alcohols, $C_1$–$C_{30}$ alkyl alcohols, $C_1$–$C_{30}$ aralkyl alcohols and $C_1$–$C_{30}$ alkylaryl phenols, as well as ether alcohols may be utilized in this regard. Specific examples of these alcohols are 1-hexanol, 1-decanol, 1-octadecanol, 2-ethyl-1-hexanol, cyclohexanol, benzyl alcohol, citronellol, methoxytriglycol, methyl carbitol, and butyl cellosolve. In general, sufficient alcohol or phenol is used to produce a product with a softening point less than about 125° C. and preferably less than 95° C. and an acid number greater than 10, although we do not wish to be bound to these limits. Optionally, reaction of the product of step 2 with an alcohol can be omitted. The temperature of esterification is generally above 100° C. and preferably above 150° C.

Reaction of the product of step 3, either esterified or unmodified and with sufficient base renders the product water-dispersible. Such a base should desirably be volatile at temperatures which do not decompose the latex, the resin, the adherend(s) or any other added material. Such bases include alkali metal hydroxides, ammonia, and amines such as, N-methylaminoethanol, N,N-dimethylaminoethanol, diethanolamine, N,N-diethylaminoethanol and the like. The amount and type of base depends upon the resin to be dispersed and the desired properties of the resultant dispersion.

The product of step 4 can be dispersed in water by its addition to water or by addition of water to it. Dispersions containing greater than 50 wt. % of the product of step 4 can be generated with the proper combination of step 3, base, and water. Alternatively, these three materials may be mixed and stirred until a dispersion is obtained.

Such dispersions can be used alone or in conjunction with other tackifiers to tackify natural rubber, neoprene and acrylic latices styrene-butadiene latices, carboxylated styrene-butadiene latices, or mixtures thereof. Ethylene-vinyl acetate copolymer latex may also be tackified.

In order to facilitate a greater understanding of the invention, the following examples are presented.

EXAMPLE I

Xylene (1,875 g.) and aluminum chloride (37.5 g.) were mixed in a 5 liter vessel for 0.5 hour; the mixture was protected with a positive nitrogen atmosphere. Afterwards, it was warmed to 70° C. and 1,250 g. of a terpene composition consisting of approximately 2 wt. % alpha-pinene, 88 wt. % beta-pinene and 10 wt. % dipentene was added over about a 1 hour interval. External cooling was employed to maintain a maximum temperature of 80° C. The mixture was stirred for 0.5 hour after completion of addition, then a solution of 37.5 g. NaOH and 187.5 g. methanol was rapidly added. After an additional 0.5 hour, the resultant material was heated to reflux for 2.0 hours. Then water and volatiles were removed until the pot temperature attained 143° C. After cooling to 130° C., the solids were separated by filtration and the volatiles were removed from the filtrate with the aid of a $N_2$ flow until the pot temperature reached 270° C.

This temperature and the $N_2$ flow were maintained for an additional 18 hours. The resultant terpene resin weighed 1,246.8 g. and had a ring and ball softening point of 55° C.

Maleic anhydride (224.4 g., 18 wt. %) was added to the resin and the mixture was stirred under a positive $N_2$ atmosphere for 24 hours at 190° C. After this time, the mixture was briefly cooled, then 850 ml xylene was added and the solution was filtered. Volatiles were then removed under vacuum until a pot temperature of 220° C., and approximately 2 mm Hg pressure were obtained. The residue weighed 1,347.4 g. and displayed a softening point of 104° C. and an acid number of 151.

A portion of this material (300 g.) was reacted with octadecanol (109.2 g.) by heating the materials to 220° C. for 16 hours. The amount of alcohol used was that which is theoretically required to convert all the anhydride groups of the molecule to the corresponding half acid esters, and is calculated on the basis of acid number. We do not, however, wish our invention to be dependent on such an occurrence. The product had a softening point of 48° C. and an acid number of 48.

A portion of this resin (50 g.) was then heated to 80° C. and treated with 1.91 g. of N,N-dimethylaminoethanol, an amount of amine sufficient to reduce the acid number by one-half, assuming zero weight for the amine. Such a process is often referred to as neutralization; and in this case, fifty percent neutralization of the resin. A temperature of 80°–100° C. was maintained for 15 minutes after addition, then the mixture was cooled to 80° C. Water was then added slowly to the stirred mixture. An apparent inversion was observed after 82 ml of water was added, whereupon heating was discontinued. The mixture thickened somewhat as it cooled, so 2 ml $H_2O$ was added to produce the final, fluid product, which appeared to be a stable dispersion of 36 wt. % solids.

The resulting dispersion was formulated with Hartex 103, a natural rubber latex, at several resin/rubber wt. ratios. Films were prepared on Mylar film and tack and peel values were obtained according to PSTC (Pressure Sensitive Tape Council, Glenwood, Ill.) methods 1, 5 and 6. Evaluation of the coated Mylar was also done with a Polyken Probe apparatus.

TABLE I

| Resin/Rubber Weight Ratio | 180° C. Peel PSTC 1 | 90° C. Quick Stick PSTC 5 | Polyken Probe | Rolling Ball PSTC 6 |
|---|---|---|---|---|
| 0/100 | 0 | 0 | 0 | 10 |
| 30/70 | 0.3 | 0.2 | 0 | 10 |
| 40/60 | 0.7 | 0.3 | 177 | 10 |
| 50/50 | 1.2 | 0.7 | 206 | 10 |
| 60/40 | 1.3 | 0.5 | 282 | 10 |
| 70/30 | 1.4 | 0.7 | 350 | 10 |

EXAMPLE II

A terpene resin was prepared as in Example I. It was reacted with 12 wt. % maleic anhydride to produce a resin with softening point 97° C. and acid number 104. This product was, in turn, reacted with an amount of octadecanol equivalent in moles to the number of anhydride groups, determined on the basis of acid number data. Softening Point 60.1° C.; Acid No. 53.

Fifty grams of this material was then sequentially reacted with 2.1 g. N,N-dimethylaminoethanol, an amount required for fifty percent neutralization, and water in a procedure similar to that of Example I. A 41 wt. % solids dispersion was formed which was formulated with Hartex 103 at several resin/rubber ratios. These were coated on Mylar and tested as in Example I (Table II).

TABLE II

| Resin/Rubber Weight Ratio | 180° C. Peel PSTC 1 | 90° C. Quick Stick PSTC 5 | Polyken Probe | Rolling Ball PSTC 6 |
|---|---|---|---|---|
| 30/70 | 0.1 | 0.2 | 136 | 10 |
| 40/60 | 0.2 | 0.2 | 148 | 10 |
| 50/50 | 0.4 | 0.2 | 490 | 9 |
| 60/40 | 1.6 | 0.9 | 796 | 10 |
| 70/30 | 2.6 | 1.4 | 650 | 10 |

EXAMPLE III

A dispersion was prepared as in Examples I and II, except that only 9 wt. % maleic anhydride was used in reaction with the terpene resin. Formulations with Hartex 103 displayed the following properties (Table III).

TABLE III

| Resin/Rubber Weight Ratio | 180° C. Peel PSTC 1 | 90° C. Quick Stick PSTC 5 | Polyken Probe | Rolling Ball PSTC 6 |
|---|---|---|---|---|
| 30/70 | 0.15 | 0.15 | 296 | 2.5 |
| 40/60 | 0.6 | 0.4 | 532 | 2.1 |
| 50/50 | 1.0 | 0.65 | 683 | 3.8 |

EXAMPLE IV

Xylene (1000 g), BF$_3$.Et$_2$O (40 g) and n-hexanol (14.4 g) were mixed in a 5 liter vessel and cooled to 10° C. A positive nitrogen atmosphere was supplied. Afterwards, a terpene mixture consisting of approximately 92% beta-pinene, 2% alpha-pinene and 6% dipentene (the latter referring to a mixture of limonene, alpha- and beta-phellandrene, terpinolene and alpha- and gamma-terpinene) was added to the contents of the 5 liter vessel in less than one hour. One-half hour after completion of addition, the reaction was warmed to room temperature, then quenched with 100 g of 20% sodium hydroxide. After warming to 80° C., the organic layer was separated from the aqueous one and was washed once with 100 g water. Subsequently, it was condensed by distillative removal of xylene and other volatiles until a pot temperature of 230° C. had been maintained for one to two hours. Distillation was aided by a nitrogen flow through the vessel. A terpene resin was obtained in 92 wt. % yield, based on the weight of monomer, that displayed a 70° C. softening point.

Nine weight percent maleic anhydride was added to a portion of this resin, and the mixture was heated under N$_2$ for 24 hours. Afterwards, the product mixture was cooled to 140° C.; then, an amount of xylene, equal to the weight of terpene resin employed, was added to the mixture. The resultant solution was washed with an amount of water, equal to ⅔ the weight of xylene, for 0.5 hour. Next, the organic layer was isolated and xylene and other volatiles were removed from the modified terpene resin by distillation to 220° C. under a vacuum of 10 Torr. The resinous residue displayed an acid number of 94 and a softening point of 87° C.

The product of the above reaction was then treated with 15.8 wt. percent n-octadecanol and the mixture was heated to 150° C. for eight hours. The product exhibited an acid number of 57 and a softening point of 60° C.

A portion of this material was reacted with 4.6 wt. % N,N-dimethylaminoethanol at 80°-90° C. Next, sufficient H$_2$O was added to make a dispersion consisting of 40% resin. The dispersion was evaluated for its ability to tackify Hartex 103 (Table IV).

TABLE IV

| Resin/Rubber Weight Ratio | 180° C. Peel PSTC 1 | 90° C. Quick Stick PSTC 5 | Polyken Probe | Rolling Ball PSTC 6 |
|---|---|---|---|---|
| 40/60 | 0.4 | 0.4 | 510 | 0.5 |
| 50/50 | 1.1 | 0.9 | 725 | 1.2 |
| 60/40 | 1.9 | 1.6 | 905 | 3.4 |

EXAMPLE V

A portion of the terpene resin described in Example IV was reacted with 4.5 wt. percent maleic anhydride as exemplified in Example IV, resulting in a modified resin with a softening point of 77° C. and an acid number of 56. This material was treated, at 90° C. with four wt. percent N,N-dimethylaminoethanol and sufficient water to produce a dispersion consisting of 40% resin. The dispersion was evaluated for its ability to tackify Hartex 103 (Table V).

TABLE V

| Resin/Rubber Weight Ratio | 180° C. Peel PSTC 1 | 90° C. Quick Stick PSTC 5 | Polyken Probe | Rolling Ball PSTC 6 |
|---|---|---|---|---|
| 40/60 | 0.9 | 0.6 | 482 | 2.2 |
| 50/50 | 1.5 | 1.0 | 682 | 6.4 |
| 60/40 | 1.8 | 1.1 | 661 | 10.0 |

EXAMPLE VI

A monomer feed consisting of 1% alpha-pinene, 66% beta-pinene, 8% dipentene, and 25% diisobutylene was polymerized at 30° C. in a fashion similar to Example I. The polymer obtained was reacted with 9 wt. % maleic anhydride and 0.3 eq. octadecanol. After reaction with N,N-dimethylethanolamine, the material was dispersed in water. The dispersion was formulated with Hartex 103 and tested as previously described (Table VI).

TABLE VI

| Resin/Rubber Weight Ratio | 180° C. Peel PSTC 1 | 90° C. Quick Stick PSTC 5 | Polyken Probe | Rolling Ball PSTC 6 |
|---|---|---|---|---|
| 40/60 | 0.5 | 0.2 | 101 | 7.4 |
| 50/50 | 0.7 | 0.3 | 135 | 10 |
| 60/40 | 1.3 | 0–0.6 | 135 | 10 |

EXAMPLE VII

A copolymer was prepared from a feed consisting of approximately 1–2% alpha-pinene, 75% beta-pinene, 8–9% dipentene and 15% 1-octadecene in the manner described in Example I. The copolymer obtained and had a softening point of 18° C. It was reacted with 7 wt. % maleic anhydride at 190° C. for 24 h, resulting in a resin of softening point 64° C., and acid number 62.

The maleinized resin was reacted with 8.9 wt. % octadecanol at 150° C. for 20 hours. The product of this reaction had a 52° C. softening point and an acid number of 45. It, in turn, was treated with 5.3 wt. % N,N-dimethylaminoethanol and sufficient water to produce a 43% solids dispersion. The dispersion was formulated with Hartex 103 at several resin/rubber ratios, and the formulations were applied to Mylar and tested as in Example I. (See Table VII).

TABLE VII

| Resin/Rubber Weight Ratio | 180° C. Peel PSTC 1 | 90° C. Quick Stick PSTC 5 | Polyken Probe | Rolling Ball PSTC 6 |
|---|---|---|---|---|
| 40/60 | 0.6 | 0.4 | 463 | 2.4 |
| 50/50 | 1.1 | 0.8 | 647 | 3.0 |
| 60/40 | 1.4 | 1.0 | 687 | 6.5 |

EXAMPLE VIII

The procedure of Example I is repeated using piperylene as the polymerizable unsaturated hydroarbon and a reaction temperature of 30° C. The resultant tackifier yields satisfactory results in a natural rubber latex.

EXAMPLE IX

The procedure of Example I is repeated using as the polymerizable mixture an equivalent amount of a petroleum hydrocarbon mixture having the analysis given above. The polymerization temperature was 30° C. Comparable results are obtained when the product is used as a tackifier in a natural rubber latex.

EXAMPLE X

The procedure of Example IX is repeated using a polymerizable mixture composed of 55% beta-pinene and 45% petroleum hydrocarbon mixture. Comparable results are obtained when the product is used as a tackifier in a natural rubber latex.

EXAMPLE XI

The procedure of Example IX is repeated using as the polymerizable mixture composed of 95% alpha-pinene and 5% piperylene. Comparable results are obtained when the product is used as a tackifier in a natural rubber latex.

EXAMPLE XII

The procedure of Example IX is repeated using as the polymerizable olefin an equivalent amount of cyclopentadiene. Comparable results are obtained when the product is used as a tackifier in a natural rubber latex.

EXAMPLE XIII

A mixture 25 wt. % of the dispersion of Example III, 25 wt. % of Aquatac 5527 produced in accordance with U.S. Pat. No. 4,183,834, Example I, and Amsco 6140 provides good adhesion between two strips of Mylar film.

EXAMPLE XIV

A portion (300 g.) of the maleinized resin of Example I (acid number 151) was reacted with 1-decanol (63.9 g.) for 5 hours at 150° C. The product had a softening point of 66° C. and an acid number of 66. Fifty grams of this material was reacted with N,N-dimethylaminoethanol (2.52 g.) and water. The dispersion was formulated with Hartex 103 and tested as previously described. The results are shown in the following Table VIII.

TABLE VIII

| Resin/Rubber Weight Ratio | 180° C. Peel PSTC 1 | 90° C. Quick Stick PSTC 5 | Polyken Probe | Rolling Ball PSTC 6 |
|---|---|---|---|---|
| 30/70 | 0.5 | 0.2 | 130 | 10 |
| 40/60 | 1.1 | 0.5 | 102 | 10 |
| 50/50 | 1.0 | 0.5 | 0 | 10 |

EXAMPLE XV

A 1000 gram quantity of beta-pinene resin having a softening point of 70° C. and produced in accordance with Example IV above was placed in a 2 liter flask under a nitrogen blanket. 35 grams of maleic anhydride were added to the resin and the mixture heated to 190° C. where it was held for 4 hours with stirring. Thereafter, the melt was sparged with superheated steam to remove excess maleic anhydride. A sample of the resin had a softening point of 84° C. and an acid number of 18. The molten resin was cooled to 110° C. and neutralized with 30 grams of N,N-dimethylaminoethanol. Slow addition of 1000 grams of water with efficient stirring at 110° C. gave a stable dispersion, a viscosity of 1200 cps. at 25° C. and an average particle size of 0.6 microncs. This tackifier was used in the adhesive compositions of Table IX below.

EXAMPLE XVI

A 1000 gram quantity of alpha-pinene resin having a softening point of 85° C. is produced in a manner similar to that disclosed in Example IV and placed in a 2 liter flask under a nitrogen blanket. After adding 35 grams of maleic anhydride the mixture is heated to 190° C. and held for 4 hours with good stirring. The melt is then sparged with super heated steam to remove unreacted maleic anhydride. A sample of the resin has a softening point of 90° C. and an acid value of 15. The molton resin is cooled to 110° C. and neutralized with 30 grams of N,N-dimethylaminoethanol. Slow addition of 1000 grams of water with efficient stirring at 110° C. gives a stable dispersion. A tackifier such as described in this Example XVI was used in the tests shown in Table X below.

The following Tables IX and X exhibit PSA properties of adhesives compounded with our polyterpene dispersions produced in accordance with Examples XV and XVI respectively, and both natural rubber and SBR latices, and mixtures thereof.

TABLE IX

Evaluation of Water-Borne/Poly Beta Pinene Tackifier

| TEST | 1 | 2 | 3 | 4** | 5 | 6 |
|---|---|---|---|---|---|---|
| 180 Peel(F) (oz/in) | 29.6 | 92 | 43.2 | 62.4 | 96 | 69.5 |
| 180 Peel(A) (oz/in) | 27.2 | 108 | 49.6 | 57.6 | 140.8 | 90.4 |
| Q-Stick(F) (oz) | 32 | 32 | 44.8 | 48 | 14.4 | 47.2 |
| Q-Stick(A) (oz) | 29.6 | 60.8 | 48 | 46.4 | 0 | 63.2 |
| Loop Tack(F) (oz/in) | 32 | 112 | 49.6 | 40 | 31.2 | 68 |
| Loop Tack(A) (oz/in) | 56 | 128 | 52.8 | 83.2 | 0 | 99.2 |
| Shear(F) (hours)* | 48+ | 8.47 | 48+ | 48+ | 21.02 | 16.48 |
| Shear(A) (hours)* | 48+ | 14.55 | 48+ | 48+ | 48+ | 48+ |
| Polyken(F) (g) | 1125 | 881 | 991 | 994 | 25 | 840 |
| Polyken(A) (g) | 1145 | 1128 | 1320 | 1555 | 71 | 989 |
| Rolling Ball(F) (in) | 1.25 | 10 | 4.5 | 7.75 | 10 | 10 |
| Viscosity(cps) | 5200 | 1850 | 1800 | 1360 | 1600 | 1450 |
| g/24 in² | 7.4 | 7.2 | 7.2 | 7.4 | 7.4 | 7.2 |
| Resin/Rubber Ratio | 50/50 | 50/16:34 | 50/34:16 | 60/40 | 60/13:27 | 60/27:13 |
| Rubber | H-103 | H-103 PL-222 | H-103 PL-222 | H-103 | H-103 PL-222 | H-103 PL-222 |

(F)Fresh
(A)Aged
H-103 Hartex 103 Natural Rubber Latex, 62.5% solids.
PL-222 Polysar 222 SBR Latex, 51% solids.
*1 Kg., ½ × ½ inch, 25 degrees C.
**Best Mode.

TABLE X

Evaluation of Water-Borne Poly Alpha Pinene Tackifier.

| TESTS | 1 | 2 |
|---|---|---|
| 180 Peel(F) (oz/in) | 24.0 | 46.0 |
| 180 Peel(A) (oz/in) | 24.2 | 44.0 |
| Q-Stick(F) (oz) | 26.4 | 45.0 |
| Q-Stick(A) (oz) | 28.2 | 45.2 |
| Loop Tack(F) (oz/in) | 48.0 | 66.2 |
| Loop Tack(A) (oz/in) | 42.0 | 84.0 |
| Shear(F) (hrs)* | 48+ | 48+ |
| Shear(A) (hrs)* | 48+ | 48+ |
| Polyken(F) (g) | 1150 | 1280 |
| Polyken(A) (g) | 1120 | 1200 |
| Rolling Ball(F) (in) | 0.5 | 10+ |
| Rolling Ball(A) (in) | 0.5 | 10+ |
| Viscosity(cps) | 1400 | 1250 |
| g/24 in² | 7.2 | 7.2 |
| Resin/Rubber Ratio** | 50/50 | 60/40 |

(F)Fresh
(A)Aged
*1 kg., ½ × ½ inch, 25 degrees C.
**Polysar 222 SBR latex, 51% solids.

EXAMPLE XV

Xylene (1500 g), BF$_3$·Et$_2$O (60 g) and n-hexanol (21.6 g) were mixed in a 5 liter vessel and cooled to 10° C. A positive nitrogen atmosphere was supplied. Afterwards, a terpene mixture consisting of approximately 92% beta-pinene, 2% alpha-pinene and 6% dipentene (the latter referring to a mixture of limonene, alpha- and beta-phellandrene, terpinolene and alpha- and gamma-terpinene) was added to the contents of the 5 litter vessel in less than one hour. One-half hour after completion of addition, the reaction was warmed to room temperature, then quenched with 100 g of 20% sodium hydroxide. After warming to 80° C., the organic layer was separated from the aqueous one and was washed once with 100 g water. Subsequently, it was condensed by distillative removal of xylene and other volatiles until a pot temperature of 230° C. had been maintained for one to two hours. Distillation was aided by a nitrogen flow through the vessel. A terpene resin was obtained in 94 wt. % yield, based on the weight of monomer, that displayed a 70° C. softening point.

Six weight percent maleic anhydride was added to a portion of this resin, and the mixture was heated under N$_2$ for 24 hours. Afterwards, the product mixture was cooled to 140° C.; then, an amount of xylene, equal to the weight of terpene resin employed, was added to the mixture. The resultant solution was washed with an amount of water, equal to ⅔ the weight of xylene, for 0.5 hour. Next, the organic layer was isolated and xylene and other volatiles were removed from the modified terpene resin by distillation to 220° C. under a vacuum of 10 Torr. The resinous residue displayed an acid number of 74 and a softening point of 65° C.

To 40 g of this material was added 10.0 g of Sylvatac 40N (a commercially available glyceryl ester of stabilized monomeric rosin having a softening point of 40° C. and an acid value of from 3-11, Sylvachem Corp.) and 2.1 g of dimethylaminoethanol. The mixture was warmed to 80° C. and sufficient water added to produce a 45% solids dispersion. It was formulated with Hartex 103 and tested as previously described. The results are shown in Table XI below.

In this case, the polyhydric alcohol (glycerine, pentaerythritol, ethylene glycol, etc) rosin ester is not soluble or stably dispersible in a latex by itself. However, when used in combination with the tackifiers of the present invention, a stable dispersion is obtained. Generally from 1% to about 30% of the rosin ester based on the weight of the tackifier, such as produced by Example XV, will be found effective as a tackifier composition for latices less costly than the otherwise unblended tackifiers of this invention.

TABLE XI

| RESIN PERCENT | 30.0 | 40.0 | 50.0 | 60.0 |
|---|---|---|---|---|
| 180 PEEL | — | 1.1 | 1.9 | 2.2 |
| 90 QUICK ST. | — | 0.9 | 1.4 | 1.4 |
| POLYKEN PROBE | — | 768.0 | 1082.0 | 1458.0 |
| ROLLING BALL | — | 2.0 | 2.3 | 3.6 |
| SHEAR | — | — | 13 | — |

The resinous tackifiers hereof, both in ionizable and ionized form, produced according to the instant invention range from liquid under ambient conditions, though often it is quite viscous, on up to a brittle solid depending upon the softening point of the resinous compositions. The inherent viscosity of the resinous compositions hereof can be controlled in part by varying the degree of ionization of the resinous composition hereof in conventional fashion. The resulting resinous composition (ionizable or ionized) can be stored and handled in such form relatively easily and in the ionized form, low softening point resinous composition can be dispersed in water for storage and handling with little or no external heating. Resinous compositions with relatively high softening points may require some heating and occasionally cosolvent addition for dispersing in water. Additionally, low softening point resinous compositions hereof may be used to assist in dispersing relatively high softening point resinous compositions in water. Such resinous compositions possess excellent long-term stability which is a decided benefit. The resinous composition predispersed in water, can be admixed directly into a conventional latex adhesive formulation typically in proportion of about 15% to 300% by weight of the latex solids of such formulation. It must be recognized, however, that the proportion of resinous composition tackifier may vary greatly from these figures depending upon the particular latex, intended application technique and the like. A latex adhesive formulation containing the novel resinous composition ionized with a volatile ionizing agent can be formed with the use of a foaming or blowing agent to provide a novel and useful foamed latex adhesive.

The novel resinous compositions hereof as tackifiers in latex adhesive formultions should be converted (or reconverted) into a hydrophobic resinous composition upon volatilization of the ionizing agent from the resinous composition accomplishes this conversion.

A variety of latex adhesives are known in the art. Such latex adhesive formulations can be derived from natural or synthetic rubbers or elastomers, such as styrene-butadiene copolymers (SBR), natural rubbers, cyclized rubbers, acrylonitrilebutadiene copolymers (NBR), chlorinated rubbers, polychloroprene (neoprene), rubber hydrochloride, polysulfide rubber, carboxylic elastomers, silicone rubbers, polyurethane rubbers (isocyanate), acrylonitrile-butadiene-styrene copolymers (ABS); butyl rubber, polyisoprene, epichlorohydrin, homopolymer rubbers, epichlorohydrinethylene oxide rubbers, propylene oxide-allyl glycidyl ether copolymer rubbers, ethylenepropylene copolymer rubbers, ethylene-propylene-diene monomer terpolymer rubbers, or mixtures thereof and the like. Alternatively, such latex adhesive formulations can be derived from the various acrylic or vinyl latices such as, for example, ethylene ethylacrylate copolymers, ethylene vinylacetates, and the like.

When a resinous tackifier hereof is dispersed in latex adhesive formulation and the water thereof volatilized along with the volatile ionizing agent, such novel resinous latex adhesive is ideally suited for a variety of uses. Typical uses of such adhesive formulation include pressure sensitive adhesives for application to tapes, labels, etc.; contact adhesives; laminated adhesives, and the like.

Such novel latex adhesive formulations containing the tackifier hereof are extremely stable even for extended periods of time and the resinous tackifier therein provides exceptional tack, peel, and sheer strength to the latex adhesive formulations. They are substantially insensitive or resistant to water. The tackifier hereof dispersed in water also possesses exceptional hydrolytic stability which is a decided benefit for the product, especially when used as a tackifier in latex adhesive compositions. Such good performance of latex adhesives containing the resinous tackifier is due at least in part to the substantial absence of conventional rosin emulsifying agents which they are incorporated. Additionally, electrostatic spraying techniques for application of a latex adhesive containing the present resinous tackifiers can be advantageous.

What is claimed is:

1. An aqueous dispersion consisting essentially of: component (a) which is a tackifier formed by
   (1) polymerizing a $C_5$–$C_{20}$ olefin monomer or a mixture of $C_5$–$C_{20}$ olefin monomers, wherein said olefin monomer is at least one terpene monomer and said mixture of olefin monomers consists of terpene monomers or a mixture of terpene monomers and up to 25% of 1-octadecene, piperylene or diisobutylene in the presence of a catalyst to obtain an hydrocarbon polymer still containing olefinic unsaturation;
   (2) reacting said hydrocarbon polymer from step (1) with an alpha-beta unsaturated dicarboxylic acid which is maleic acid, fumaric acid, citraconic acid or itaconic acid, the anhydride or lower alkyl monoester thereof to obtain a resinous product containing free carboxyl groups;
   (3) partially esterifying said product from step (2) with an aliphatic alcohol which is octadecanol or decanol to obtain an ionizable resinous composition of acid number 10–150 and softening point not higher than 125° C.;
   (4) neutralizing said resinous composition from step (3) with a base which is volatile at a temperature at which said product is not decomposed to obtain a water dispersible product;
component (b) which is water;
component (c) which is a natural rubber latex and the proportions of component (a) and component (c) are between 30:70 and 70:30 by weight respectively in said dispersion, and the ratio of component (a) to component (b) in the dispersion is 36–45% by weight.

2. An aqueous dispersion consisting essentially of: component (a) which is a tackifier formed by:
   (1) polymerizing a $C_5$–$C_{20}$ olefin monomer or a mixture of $C_5$–$C_{20}$ olefin monomers, wherein said olefin monomer is a terpene monomer and said mixture of olefin monomers consists of terpene monomers or a mixture of terpene monomers and up to 25% of 1-octadecene, piperylene or diisobutylene in the presence of a catalyst to obtain an hydrocarbon polymer still containing olefinic unsaturation;
   (2) reacting said hydrocarbon polymer from step (1) with an alpha-beta unsaturated dicarboxylic acid which is maleic acid, fumaric acid, citraconic acid or itaconic acid, the anhydride or lower alkyl monoester thereof to obtain a resinous product containing free carboxyl groups;
   (3) neutralizing said resinous compositions from step (2) with a base which is volatile at a temperature at which said product is not decomposed to obtain a water dispersible product;
component (b) which is water;
component (c) which is a natural rubber latex and the proportions of component (a) and component (c) are between 30:70 and 70:30 by weight respectively in said dispersion, and the ratio of component (a) to component (b) in the dispersion is 36–45% by weight.

3. An aqueous dispersion consisting of: component (a) which is a tackifier formed by:
   (1) polymerizing a $C_5$–$C_{20}$ olefin monomer or a mixture of $C_5$–$C_{20}$ olefin monomers, wherein said olefin monomer is a terpene monomer and said mixture of olefin monomers consists of terpene monomers and up to 25% of 1-octadecene or piperylene or diisobutylene in the presence of a catalyst to obtain an hydrocarbon polymer still containing olefinic unsaturation;

(2) reacting said hydrocarbon polymer from step (1) with an alpha-beta unsaturated dicarboxylic acid which is maleic acid, fumaric acid, citraconic acid or itaconic acid, the anhydride or lower alkyl monoester thereof to obtain a resinous product containing free carboxyl groups;

(3) esterifying said product from step (2) with an aliphatic alcohol which is octadecanol or decanol to obtain an ionizable resinous composition of acid number 10–150 and softening point not higher than 125° C.;

(4) neutralizing said resinous composition from step (3) with a base which is volatile at a temperature at which said product is not decomposed to obtain a water dispersible product;

component (b) which is water;

component (c) which is a natural rubber latex and the proportions of components (a) and (c) are between 30:70 and 70:30 by weight respectively in said dispersion, and the ratio of component (a) to component (b) is 36–45% by weight; and component (d) which is a rosin ester in the amount of 1%–30% by weight of said compound (a).

4. An aqueous dispersion according to claim 3 wherein said rosin ester is a glyceryl ester of stabilized monomeric rosin.

5. An aqueous dispersion consisting essentially of: component (a) which is a tackifier formed by (1) polymerizing a $C_5$–$C_{20}$ olefin monomer which is cyclopentadiene, a mixture of 3-methyl 1-pentene, 2-methyl-2-butene, 2-methyl-1-pentene, isoprene, piperylene and piperylene dimer in the presence of a catalyst to obtain a polymer still containing olefinic unsaturation;

(2) reacting said hydrocarbon polymer from step (1) with an alpha-beta unsaturated dicarboxylic acid which is maleic acid, fumaric acid, citraconic acid or itaconic acid, the anhydride or lower alkyl monoester thereof to obtain a resinous product containing free carboxyl groups;

(3) partially esterifying said product from step (2) with an aliphatic alcohol which is octadecanol or decanol to obtain an ionizable resinous composition of acid number 10–150 and softening point not higher than 125° C.;

(4) neutralizing said resinous composition from step (3) with a base which is volatile at a temperature at which said product is not decomposed to obtain a water dispersible product;

component (b) which is water;

component (c) which is a natural rubber latex and the proportions of component (a) and component (c) are between 30:70 and 70:30 by weight respectively in said dispersion, and the ratio of component (a) to component (b) is 36–45% by weight.

6. An aqueous dispersion consisting essentially of: component (a) which is a tackifier formed by:

(1) polymerizing a $C_5$–$C_{20}$ olefin mixture which consists of 55% of a terpene monomer and 45% of a mixture of 3-methyl-1-butene, 3-methyl-2-butene, 2-methyl-1-pentene, isoprene, piperylene and piperylene dimer in the presence of a catalyst to obtain an hydrocarbon polymer;

(2) reacting said hydrocarbon polymer from step (1) with an alpha-beta unsaturated dicarboxylic acid which is maleic acid, fumaric acid, citraconic acid or itaconic acid, the anhydride or lower alkyl monoester thereof to obtain a resinous product containing free carboxyl groups;

(3) partially esterifying said product from step (2) with an aliphatic alcohol which is octadecanol or decanol to obtain an ionizable resinous composition of acid number 10–150 and softening point not higher than 125° C.;

(4) neutralizing said resinous composition from step (3) with a base which is volatile at a temperature at which said product is not decomposed to obtain a water dispersible product;

component (b) which is water;

component (c) which is a natural rubber latex and the proportions of component (a) and component (c) are between 30:70 and 70:30 by weight respectively in said dispersion, and the ratio of component (a) to component (b) is 36–45% by weight.

7. The aqueous dispersion according to claim 1, wherein said olefin monomers in step (1) are 5–95% beta-pinene, the balance being piperylene.

8. The aqueous dispersion according to claim 1, wherein said olefin monomers in step (1) are a mixture of alpha-pinene, beta-pinene and dipentene.

9. The aqueous dispersion according to claim 1, wherein said olefin monomers in step (1) are a mixture of terpene monomers and 15% octadecene.

10. The aqueous dispersion according to claim 1, wherein said olefin monomer is piperylene.

11. The aqueous dispersion according to claim 1, wherein said olefin monomer in step (1) is cyclopentadiene.

* * * * *